United States Patent [19]

Okino et al.

[11] Patent Number: 5,371,539
[45] Date of Patent: Dec. 6, 1994

[54] VIDEO CAMERA WITH ELECTRONIC PICTURE STABILIZER

[75] Inventors: Toshiyuki Okino, Kadoma; Toshiya Iinuma, Moriguchi; Akio Kobayashi, Hirakata, all of Japan

[73] Assignee: Sanyo Electric Co., Ltd., Osaka, Japan

[21] Appl. No.: 224,076

[22] Filed: Apr. 7, 1994

Related U.S. Application Data

[63] Continuation of Ser. No. 963,402, Oct. 19, 1992, abandoned.

[30] Foreign Application Priority Data

| Oct. 18, 1991 | [JP] | Japan | 3-271079 |
| Oct. 24, 1991 | [JP] | Japan | 3-277781 |
| Oct. 24, 1991 | [JP] | Japan | 3-277782 |
| Jan. 31, 1992 | [JP] | Japan | 4-016010 |
| Feb. 19, 1992 | [JP] | Japan | 4-032098 |
| Mar. 2, 1992 | [JP] | Japan | 4-044689 |

[51] Int. Cl.[5] .................... H04N 5/30; H04N 5/228; H04N 7/18
[52] U.S. Cl. .................... 348/207; 348/208; 348/155; 348/352; 348/413; 348/414; 348/415; 348/416; 348/417; 348/418; 348/699; 348/222
[58] Field of Search ............ 348/155, 208, 352, 413, 348/414, 415, 416, 417, 418, 699, 207

[56] References Cited

U.S. PATENT DOCUMENTS

| 5,027,203 | 6/1991 | Samad et al. | 358/140 |
| 5,036,393 | 7/1991 | Samad et al. | 358/140 |
| 5,047,850 | 9/1991 | Ishii et al. | 358/105 |
| 5,126,841 | 6/1992 | Tanaka et al. | 358/105 |
| 5,184,216 | 2/1993 | Kobayashi | 358/105 |

*Primary Examiner*—Michael T. Razavi
*Assistant Examiner*—Bipin Shalwala
*Attorney, Agent, or Firm*—Armstrong, Westerman, Hattori, McLeland & Naughton

[57] ABSTRACT

A video camera includes a solid-state image sensing device, and an electric signal from the image sensing device is converted by a camera circuit into a video signal which is further converted into a digital video signal by an A/D converter. The digital video signal is stored in a field memory sequentially field by field under control of a memory control circuit. A motion detecting circuit which receives the digital video signal calculates correlative values for each of a plurality of blocks constituting a whole screen according to a representative point matching method. A microcomputer calculates motion vectors of respective blocks on the basis of correlative value data from the motion detecting circuit and an average motion vector thereof, and calculates "increase", "passing degree" and "variation". The microcomputer further evaluates a reliability of each of the blocks according to a fuzzy inference by utilizing the increase, passing degree and variation as parameters. The memory control circuit determines correction amount for a picture stabilization on the basis of the reliability and the average motion vector.

2 Claims, 17 Drawing Sheets

F I G. 3
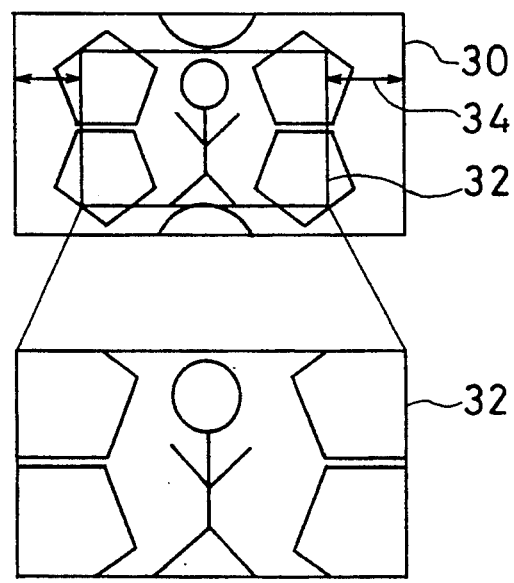
F I G. 4
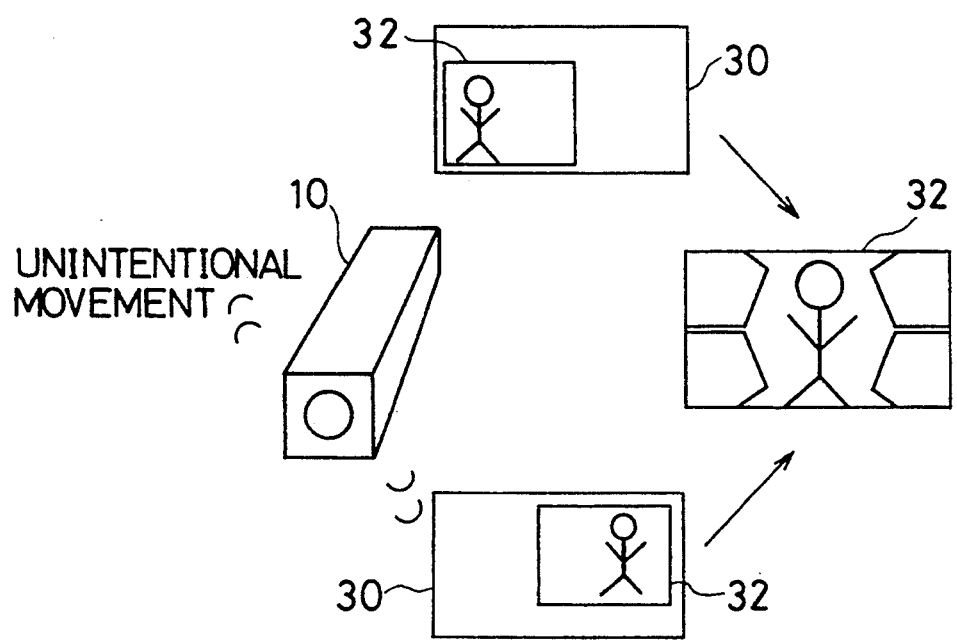

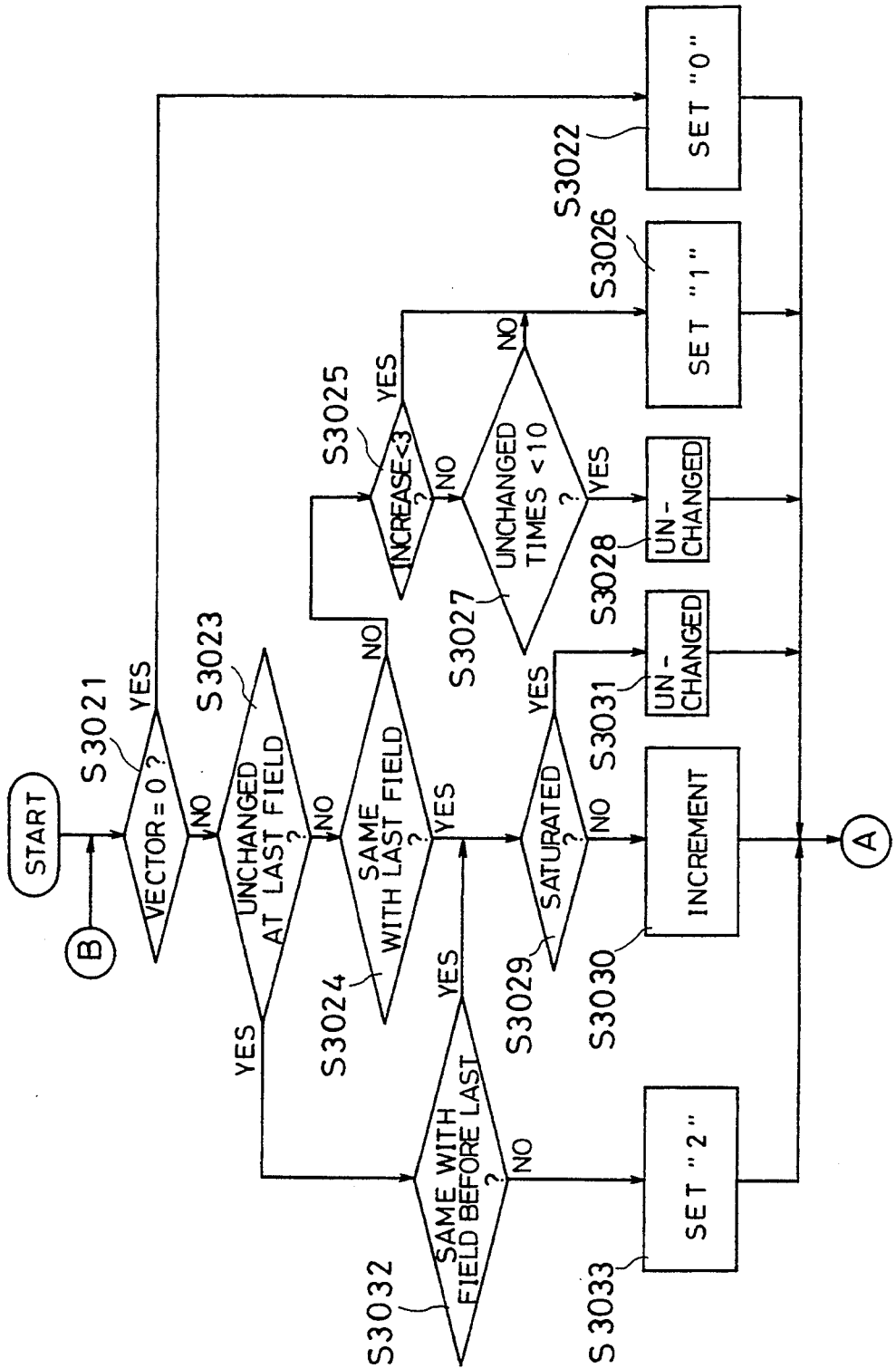
F I G. 13A

F I G. 13B
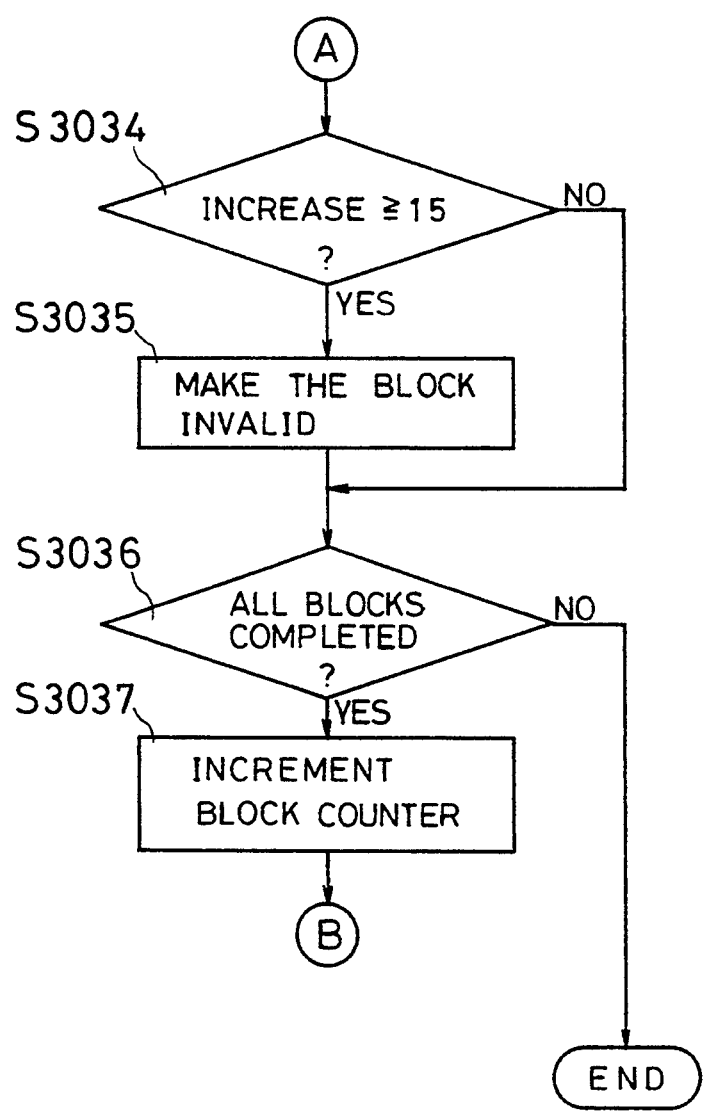

VIDEO CAMERA WITH ELECTRONIC PICTURE STABILIZER

This application is a continuation of application Ser. No. 07/963,402 filed Oct. 19, 1992, now abandoned.

BACKGROUND OF THE INVENTION

1. Field of the Invention

The present invention generally relates to a video camera. More specifically, the present invention relates to a compact video camera with electronic picture stabilizer, in which motion vectors of four (4) blocks within an image field are detected according to a representative point matching method so as to control reading addresses of a field memory.

2. Description of the Related Art

In conventional such a kind of a compact video camera, as disclosed in pages 48–54 of National Technical Report Vol. 37No. 3 June, 1991, a dispersion that is a magnitude of an absolute value of a difference between an average motion vector and a motion vector of each block is evaluated, and an image extracting area, i.e., a reading address of a field memory is determined by multiplying a coefficient according to the dispersion and the average motion vector. A digital video signal of the image extracting area that is read from the field memory is given to an electronic zooming circuit or interpolation circuit so as to be subjected to an enlargement or interpolation, so that a video signal with no instability can be obtained.

In addition, the above described dispersion can be calculated, specifically, according to the following equation.

$$\text{dispersion} = \frac{\Sigma(|aveX - vectX| + |aveY - vectY|)}{n}$$

aveX and aveY: average motion vector
vectX and vectY: motion vector of each block
n: number of blocks In the above described prior art, it can be expected that a picture stabilization with accuracy is implemented when the dispersion is small, that is, when no passing object exists in all the blocks in the image field. However, in a case where a passing object enters in a specific block, the dispersion becomes large and an error occurs in the average motion vector, and therefore, it is difficult to implement an effective picture stabilization.

SUMMARY OF THE INVENTION

Therefore, a principal object of the present invention is a novel video camera with an electronic picture stabilizer.

Another object of the present invention is to provide a video camera in which a picture stabilization with accuracy can be implemented.

Another object of the present invention is to provide a video camera in which a picture stabilization with accuracy can be implemented even when a passing object enters in an image sensing field.

In a video camera according to the present invention, an electronic signal from an image sensing device such as a CCD is converted into a digital video signal by a signal converting means. The digital video signal is stored in a memory means sequentially field-by-field under control of a memory control means. On the other hand, the digital video signal is also applied to a correlative value calculating means which calculates correlative values for each of a plurality of blocks within an image field according to a well-known representative point matching method. A first calculating means, such as a microcomputer, calculates a motion vector for each block on the basis of data of the correlative values. In an embodiment of the present invention, a parameter output means and a second calculating means are also constituted by the microcomputer. The parameter output means utilizes motion vectors of respective blocks in calculating an increase, variation or isolation, and utilizes the correlative values in calculating a passing degree. Thus, the passing degree, increase, variation or isolation is outputted by the parameter output means.

In addition, the passing degree is an index representative of a period from a time when a sudden change occurs in the correlative values to a time when the correlative values become reliable. The increase is an index representative of a period in which the motion vectors having the same direction are obtained succeedingly. The variation is an index representative of a degree of variation between a motion vector of a current field or frame and a motion vector of a last field or frame. The isolation is an index representative of a rate of a difference between an average vector and a motion vector of each block with respect to the average vector.

On the basis of one or more parameters thus calculated and the motion vectors, a second calculating means calculates an average motion vector of a whole screen or image field. A reading address is determined on the basis of the average motion vector, and the digital video signal is read-out from the memory means according to the reading address. The digital video signal read from the memory means is preferably applied to an electronic zooming means in which the same is subjected to an enlargement process according to an interpolation operation, for example. Therefore, an unintentional movement of a picture or image can be effectively prevented.

In a preferred embodiment, a first determining means determines whether or not each of the plurality of blocks is invalid on the basis of the above described one or more parameters, and the second calculating means calculates the above described average motion vector on the basis of the motion vectors of blocks excluding the blocks that is determined invalid by the first determining means.

However, a weighted mean value of the motion vectors of all the blocks may be calculated on the basis of the above described one or more parameters by the second calculating means.

According to the present invention, since the average motion vector is calculated by taking states of the respective blocks that are indicated by the parameters into consideration, even if a passing object enters into a specific block, it is possible to minimize an influence of the passing object, and therefore, a picture stabilization with accuracy can be implemented.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing a principle of an electronic zooming process;

FIG. 4 is an illustrative view showing a principle of a picture stabilization;

FIGS. 13A and 13B are flowcharts showing determination of an invalid block utilizing only an increase;

DETAILED DESCRIPTION OF THE PREFERRED EMBODIMENTS

Figure 1:
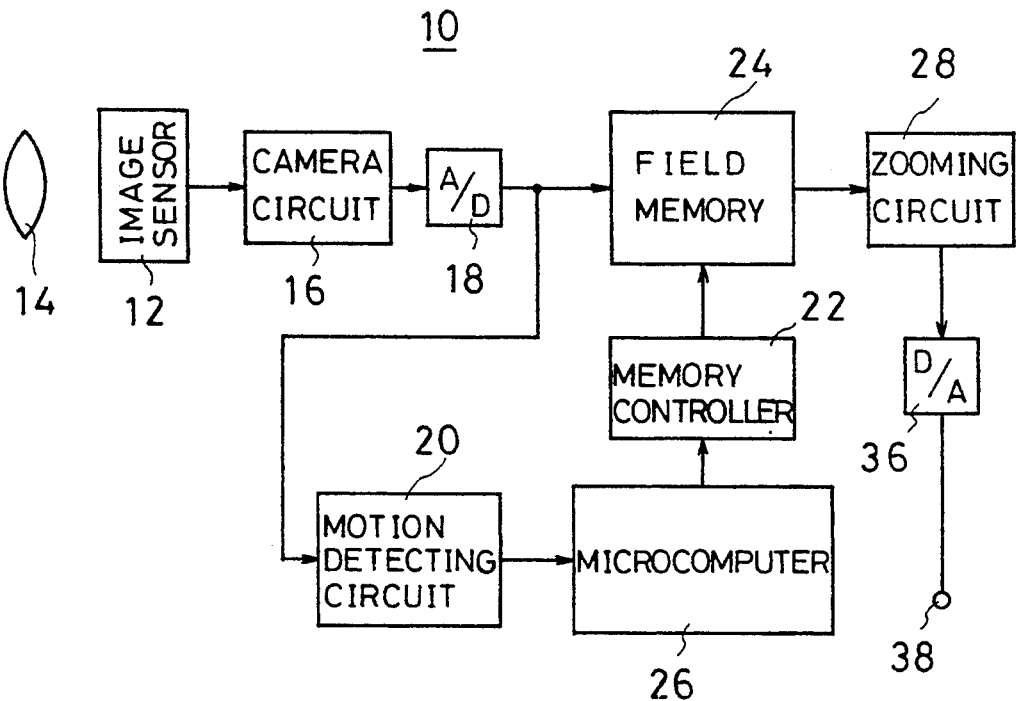
FIG. 1 is a block diagram showing one embodiment according to the present invention.

A video camera 10 of a preferred embodiment shown in FIG. 1 includes a solid-state image sensing device 12 such as a CCD (Charge-Coupled Device) which converts an optical signal being inputted from a subject (not shown) through a lens 14 into an electric signal. The electric signal from the solid-state image sensing device 12 is inputted to a camera circuit 16. As is well known, the camera circuit 16 includes a sample-hold circuit by which the electric signal from the solid-state image sensing device is sampled and held. A level of the electric signal thus sampled and held is adjusted by an AGC (Automatic Gain Control), and synchronization signals are added to the electric signal by a synchronization signal adding circuit (not shown). Thus, the camera circuit converts the electric signal from the solid-state image sensing device 12 into an analog video signal. The analog video signal is further converted into a digital video signal by an A/D converter 18. The digital video signal is applied to a motion detecting circuit 20. As the motion detecting circuit 20, for example, an LSI "L7A0948" manufactured by Sanyo Electric Co., Ltd. who is an assignee of the present invention may be utilized. Under control of a memory control circuit 22 which is included in the same LSI constituting the motion detecting circuit 20, the digital video signal is written into a field memory 24 field by field.

Although described later in detail, the motion detecting circuit 20 evaluates correlative values, for each of respective blocks A, B, C and D shown in FIG. 2 by utilizing a well-known representative point matching method.

Figure 2A:
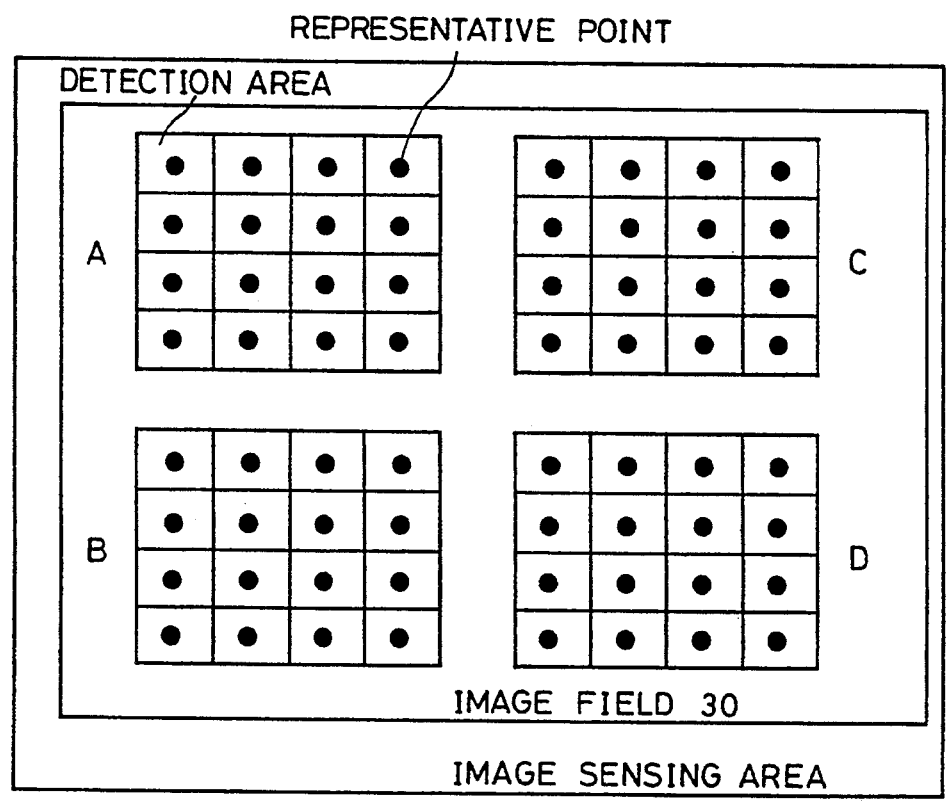
FIGS. 2A and 2B are illustrative views showing respective blocks in an image field to which a representative point matching method is applied.
Figure 2B:
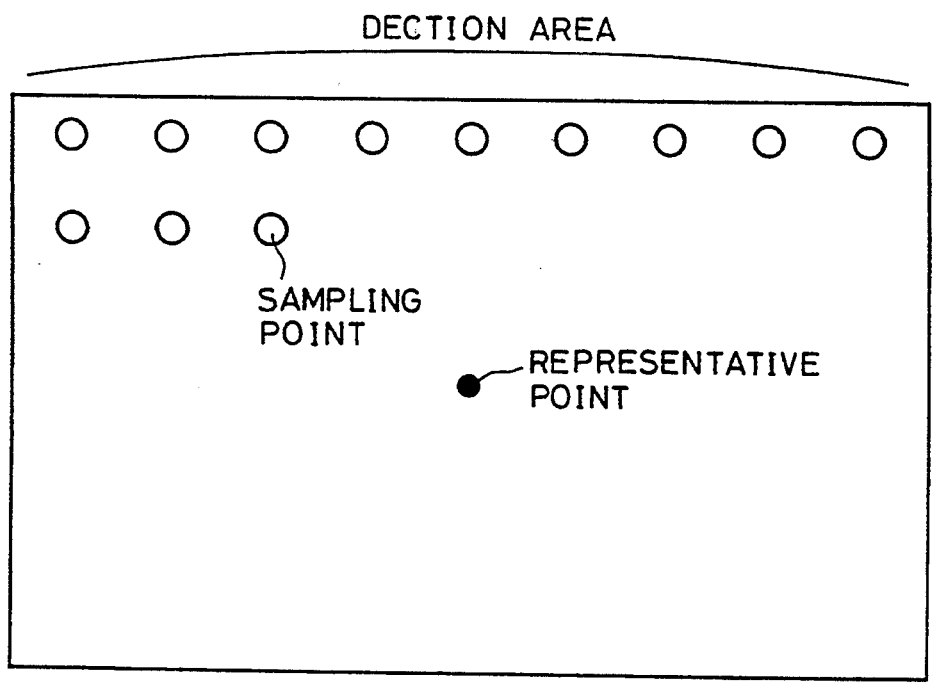

Now, with reference to FIGS. 2A and 2B, this representative matching method will be described. As shown in FIGS. 2A, an image field 30 is contained in an image sensing area that is formed by the solid-state image sensing device 12. There are formed four blocks A, B, C and D in the image field. Furthermore, each of the blocks includes a predetermined number (in FIG. 2A, "16") of detection areas. As shown in FIG. 2B, a detection area is composed of a plurality of sampling point of which a representative point is determined. The motion detecting circuit 20 calculates the correlative values on the basis of luminance levels of respective sampling points.

More specifically, in the motion detecting circuit 20, absolute values of differences between luminance level of the respective sampling points within each of the detection areas at a current field or frame and a luminance level of the representative point within the same detection area at a last field or frame. That is, correlative values of the luminance levels of the respective sampling points with respect to the representative point in the same detection area. The correlative values of the luminance levels are accumulated for each of the sampling having the same deviation in position with respect to the representative point, i.e. having the same positional relationship with respect to the representative point.

A sampling point having a minimum accumulated value is a point having a highest correlation degree, and therefore, positional data and correlative values (accumulated values) of the above described point and other four (4) points around the point.

The positional data and correlative values data from the motion detecting circuit 20 is applied to a microcomputer 26. In a microcomputer 26, on the basis of the positional data and the correlative values data, an average motion vector of a whole image field 30 (FIG. 2) is calculated according to flowcharts described later in detail. Data of the average motion vector is applied to the memory control circuit 22 which determines a start address for reading the field memory 24, and therefore, the digital video signal is read-out from the field memory 24. In other words, the memory control circuit 22 moves an image extracting area 32 (FIG. 3 or 4) formed by the digital video signal stored in the field memory 24 according to the average motion vector that is calculated by the microcomputer 26.

In addition, it is impossible to move the image extracting area 32 by only the digital video signal readout from the field memory 24, and therefore, in this embodiment shown, an electronic zooming circuit 28 is utilized.

With reference to FIG. 3, the electronic zooming circuit 28 (FIG. 1) defines the image extracting area 32 wherein an image is enlarged according to a zooming magnification with respect to the image field 30. A position of the image extracting area 32 can be freely moved within a range of the image field 30 by changing a start address for reading-out the digital video signal from the field memory 24. Then, in order to obtain a video signal for a whole area of the image field 30 on the basis of the digital video signal extracted from the image extracting area 32, an image is enlarged by utilizing an internal interpolation on the basis of the digital video signal read-out from the field memory 24.

Thus, by zooming-up an image of an arbitrary image extracting area 32 within the image field 30 in an electronic manner by the electronic zooming circuit 28 (FIG. 1), a correctable range 34 that is equal to a difference between the image field 30 and the image extracting area 32 can be formed.

If an unintentional movement occurs in the video camera 10 as shown in FIG. 4 according to a vibration of a hand of a person who operates the video camera, an image from the video camera is blurred, and resulting in a case where a subject person exists in a left-lower portion within the image field 30 (shown at an upper portion in FIG. 4) or a case where a subject person exists at a right-upper portion within the image field (shown at a lower portion in FIG. 4). Therefore, by moving the image extracting area 32 at every field according to the average motion vector that is calculated by the microcomputer 26, as shown at a right portion in FIG. 4, the subject person can be just positioned in the image extracting area 32.

The digital video signal thus outputted from the electronic zooming circuit 28 is converted into an analog signal by a D/A converter 36 so as to be outputted from an output terminal 38.

Figure 5:
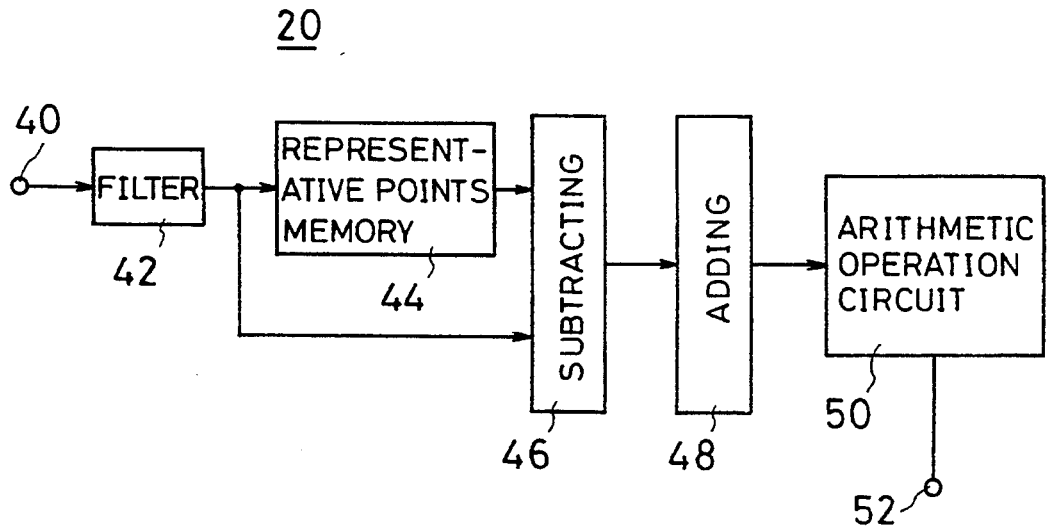
FIG. 5 is a block diagram showing a motion detecting circuit shown in FIG. 1.

With reference to FIG. 5, the motion detecting circuit 20 shown in FIG. 1 includes an input end 40 which receives the digital video signal from the A/D converter 18. The digital video signal inputted to the input end 40 is applied to the representative point memory 44 and a subtracting circuit 46, respectively, through a filter 42. The filter 42 is a kind of digital low-pass filter which is utilized for improvement of an S/N ratio so as to secure a significant detection accuracy with a lesser number of representative points.

The representative point memory 44 stores positional data and luminance data of a plurality of representative points within each of the respective blocks A-D shown in FIG. 2. The subtracting circuit 46 executes subtracting operations of the luminance data read-out from the representative point memory 44 of the representative point and another points or pixels surrounding the representative point, and applies a subtracted result to an accumulating and adding circuit 48. The accumulating and adding circuit 48 executes an accumulation and addition of the subtracted results by the subtracting circuit 46 of the same position or pixel in the same block so as to output correlative values data. The correlative values data is applied to an arithmetic operation circuit 50 which evaluates a minimum correlative value and calculates an average correlative value for each of the blocks A-D, and evaluates positional data of the pixel having the minimum correlative value. Data of the minimum correlative value, average correlative value and positions thus obtained by the arithmetic operation circuit 50 is applied to the above described microcomputer 26 from an output end 52. In addition, such arithmetic operations for the correlative values can be performed by the above described LSI "L7A0948".

Figure 6:
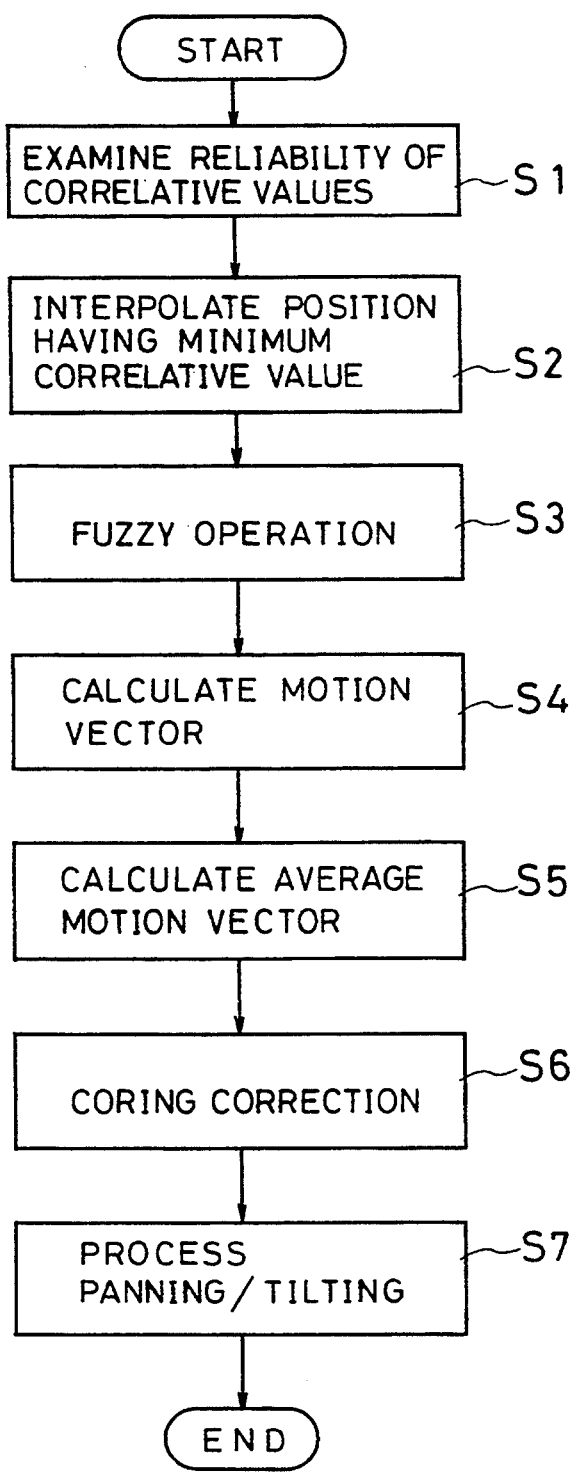
FIG. 6 is a flowchart showing an operation of the embodiment according to the present invention.

The microcomputer 26 operates in accordance with a flowchart shown in FIG. 6. More specifically, in a first step S1 of FIG. 6, the microcomputer 26 detects whether or not a value which is obtained by dividing the minimum correlative value with tile mean value of the correlative values is less than a predetermined threshold value so as to determine whether or not motion vectors of respective blocks A-D are reliable. Then, in a next step S2, in order to make detection accuracy of motion vectors good, a pixel position having the minimum correlative value is calculated by implementing an internal interpolation utilizing the correlative values of four pixels around the pixel having the minimum correlative value.

In a next step S3, the microcomputer detects a block in which a movement other than the intentional movement, for example, a passage of an passing object or a movement of a passing object out of the blocks A-D (FIG. 2) by executing a fuzzy operation described later so that such a block can be removed from a correction routine after the step. In a step S4, the microcomputer 26 calculates motion vectors of the blocks by utilizing the correlative values that are determined reliable in the step S1. Then, in a succeeding step S5, by integrating the motion vectors at every field, an average motion vector is calculated at every field. Then, a coring correction in the step S6, and a panning and tilting processes in a step S7 are executed. In the coring correction of the step S6, an influence due to a noise is removed from the motion vectors calculated in the step S5. In addition, in the panning/tilting processes in the step S7, an influence that is added to the motion vectors in panning or tilting the video camera can be removed. Thus, the microcomputer 26 calculates motion vectors of a current field on the basis of the motion vectors of effective blocks and motion vectors of succeeding two fields.

Figure 7:
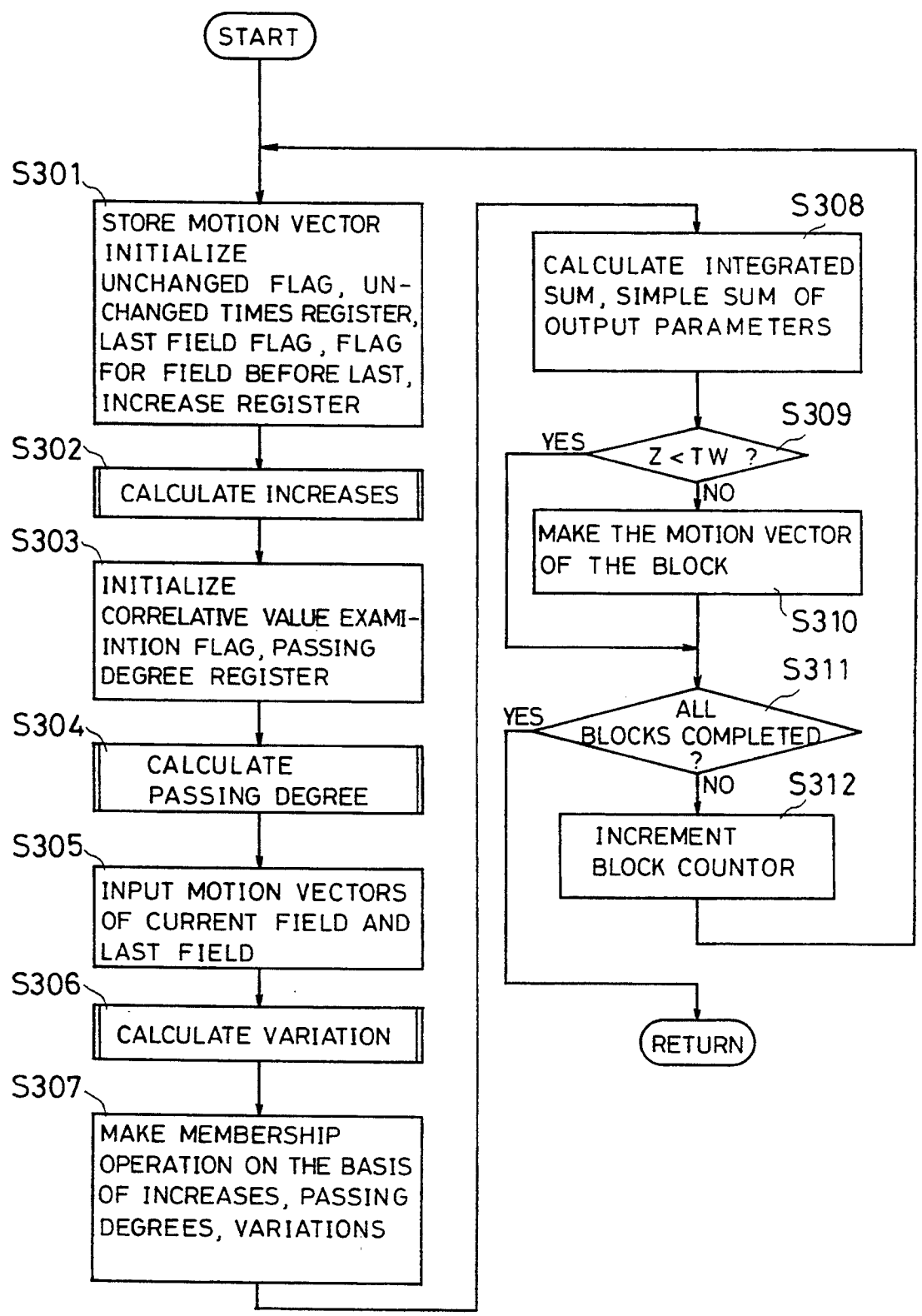
FIG. 7 is a flowchart showing a fuzzy determination routine shown in FIG. 6.

In a first step S301 of a fuzzy determination routine shown in FIG. 7, the microcomputer 26 stores a motion vectors that have been calculated on the basis of the correlative values the reliability of which has been determined in the previous step S1 (FIG. 6) and the position or pixel having the minimum correlative value that has been interpolated in the step S2 (FIG. 6) in a RAM (not shown), and initializes an unchanging flag, an unchanged times register, a last field flag, a flag for field before last, and increase register which are respectively formed in the RAM.

Figure 8:
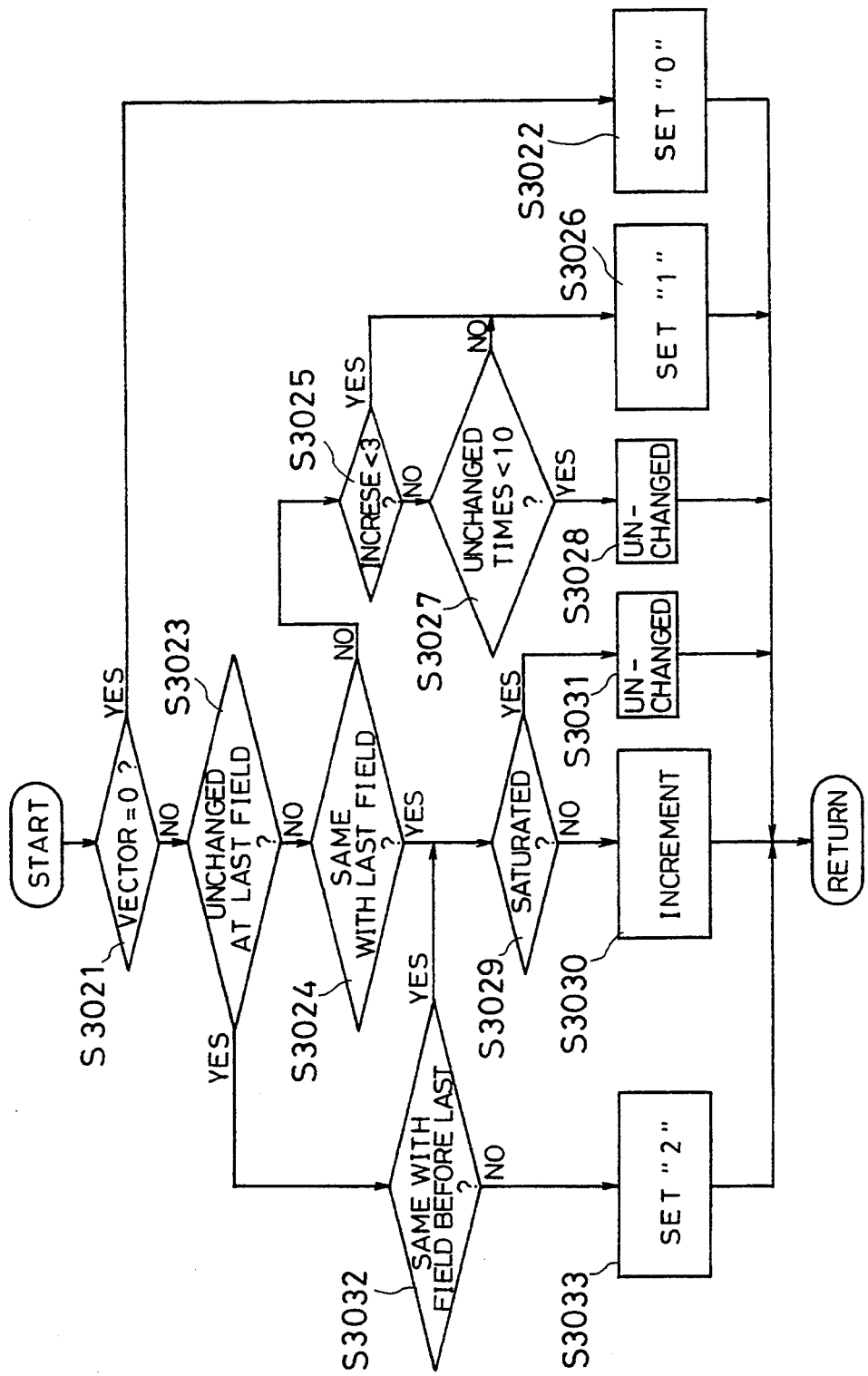
FIG. 8 is a flowchart showing an increase calculating routine shown in FIG. 7.

In a next step S302, the microcomputer 26 calculates an increase by executing an increase calculating routine shown in FIG. 8 in detail. In addition, "increase" is a parameter representative of a time period during when motion vectors having the same direction are continuously obtained. In a case of a normal unintentional movement, such an increase does not become large because there is no case where motion vectors having the same direction are continuously obtained for a long time. However, in a case where a passing object enters within an image sensing area, the increase becomes large because moving vectors having the same direction are succeedingly obtained.

In the increase calculating routine shown in FIG. 8, in a first step S3021, the microcomputer 26 determines whether or not the motion vector of a current block is zero. If the motion vector of the current block is zero, in a next step S3022, "0" is set in the increase register (not shown), and the routine is terminated. A fact that tile motion vector is zero means no unintentional movement or no passing object exists, and therefore, in this case, it is not necessary to determine whether the current block is valid or invalid.

In a case where "NO" is determined in the step S3021, that is, in a case where the motion vector of the current block is not zero, in a succeeding step S3023, it is determined whether or not the increase is unchanged at the last field. If the value of the increase register is unchanged at the last field, in a next step S3024, the microcomputer 26 determines whether or not a direction of the motion vector of the current field is the same as a direction of the motion vector of the last field with reference to the last field flag. In a case where the motion vector of the current field is different in direction from that of the last field, in a succeeding step S3025, the microcomputer 26 determines whether or not the increase is smaller than "3". In a case where the increase is smaller than "3", that is, in a case of the increase <3, in a step S3026, the microcomputer 26 determines that a passing object passed through the block to be examined presently, and therefore, sets a minimum increase "1" in the increase register.

However, in a case where the increase is larger than "3", that is, in a case of increase ≧3, there is a doubt that a passing object enters in the current field but that is not able to be settled, and therefore, in a succeeding step S3027, the microcomputer 26 determines whether or not the unchanged times by the last field is less than a predetermined threshold value ("10" in this embodiment shown) with referring to the unchanged times register. Then, if a value of the unchanged times register is larger than "10", the process proceeds to the previous step S3026 so that the minimum increase "1" is set into the increase register.

If the value of the unchanged times register is smaller than "10", in a next step S3028, the microcomputer 26 does not change the value of the increase register so that the current value of the increase is held as it is. Originally, the increase is to be sequentially incremented from "1" when a change occurs in a direction of the motion vector. However, if the increase by the last field is sufficiently large, the microcomputer 26 does not determine that a change occurs in a direction of the motion vector even if the direction of the motion vector is changed once, thereby to eliminate the influence due to a noise and etc. However, in a case where the value of the unchanged times register exceeds the threshold value ("10"), since it can be considered that the direction of the motion vector frequently varied is not only due to the noise. Therefore, in such a case, the process can go out the routine through the step S3026.

In addition, in a case where "YES" is determined in the previous step S3024, that is, in a case where the direction of the motion vector of the current field and the direction of the motion vector of the last field is the same, in a next step S3029, the microcomputer 26 determines whether or not the increase is saturated. Since the increase is set in advance in a manner that the same can be obtained a value from "0" to "31", in the step S3029, the microcomputer 26 determines whether or not the increase reaches "31". If the increase is not saturated, in a next step S3030, the microcomputer 26 increments the increase register. If the increase is saturated, in a next step S3031, the value of the increase register is maintained as it is.

Furthermore, in a case where "YES" is determined in the step S3023, that is, in a case where "unchanging" in the step S3028 is also performed at the last field, in a next step S3032, the microcomputer 26 determines whether or not the direction of the motion vector of the current field is the same as the direction of the motion vector of the field before last with reference to the flag for field before last. If "YES", the process proceeds to the previous step S3029 so as to determine whether or not the increase is saturated. Then, if "NO" is determined in the step S3032, in a succeeding step S3033, the microcomputer 26 determines that the direction of the motion vector is truly changed, and sets "2" into the increase register.

Thus, by calculating the increase of the motion vector for each block at every field of 1/60 seconds, a time period during when the motion vectors having the same direction in the same block can be integrated. That is, during a time when the increase is incremented, a passing object is passing through the block, and therefore, the block may be omitted for calculation of an average motion vector for a picture stabilization.

By calculating the increase in the step S302 (FIG. 7) that is shown in FIG. 8 in detail, it is possible to determined whether or not each of the blocks may be handled as a valid block; however, in this embodiment shown, in order to make such determination further accurate, in next steps S303 and S304, "passing degree" is calculated.

In calculating the passing degree, in the step S303, the microcomputer 26 initializes a correlative value determination flag, a passing degree register and etc. respectively formed in the RAM (not shown).

Figure 9:
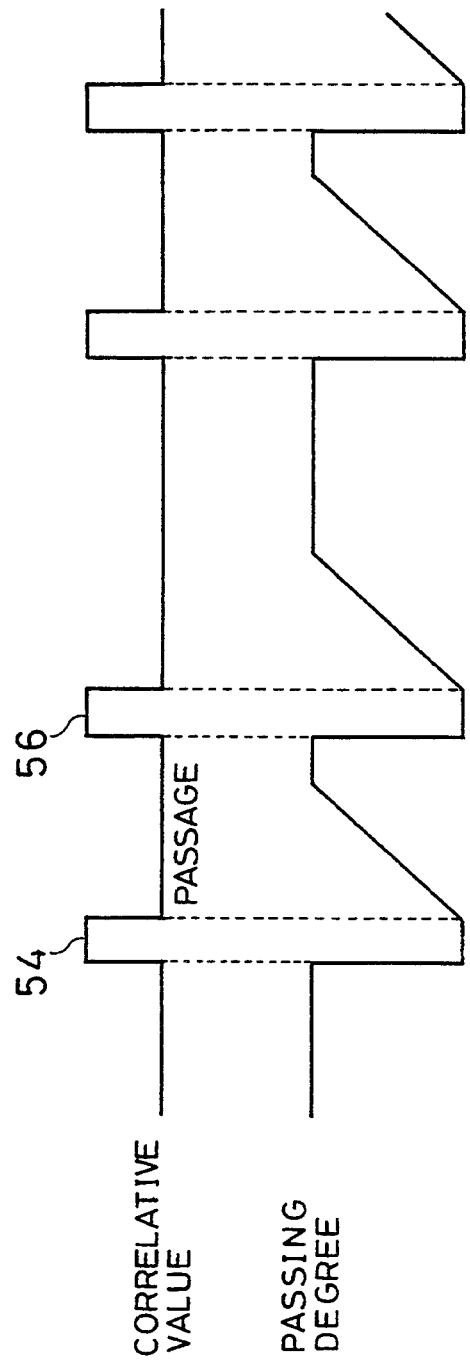
FIG. 9 is a timing chart showing a relationship between a correlative value and a passing degree.

When a passing object enters in a given block, as shown by a reference numeral 54 in FIG. 9, a correlative value becomes large suddenly, and thereafter, the correlative value becomes small. In a similar manner, when the passing object goes out a given block, as shown by a reference numeral 56 in FIG. 9, the correlative value becomes large suddenly, and thereafter, the correlative value becomes small. It is an idea of introduction of the passing degree that a sudden change in the correlative value is detected so that it is determined whether or not a passing object enters in a block. Thus, if a passing object enters or goes-out into or from the block, the correlative value suddenly rises, and therefore, the microcomputer 26 detects such a sudden 0 rising of the correlative value so as to drastically lower the passing degree as shown in FIG. 9, and thereafter, increase the passing degree with a constant rate from a timing when the correlative value rises. Then, when further rising occurs in the correlative value, the microcomputer 26 drastically lower the passing degree again.

In accordance with such control, the passing degree register is cleared when the correlative value becomes large drastically, and thereafter, the passing degree register is incremented at every field during when the correlative value is maintained small, and therefore, the passing degree can be calculated.

Figure 10:
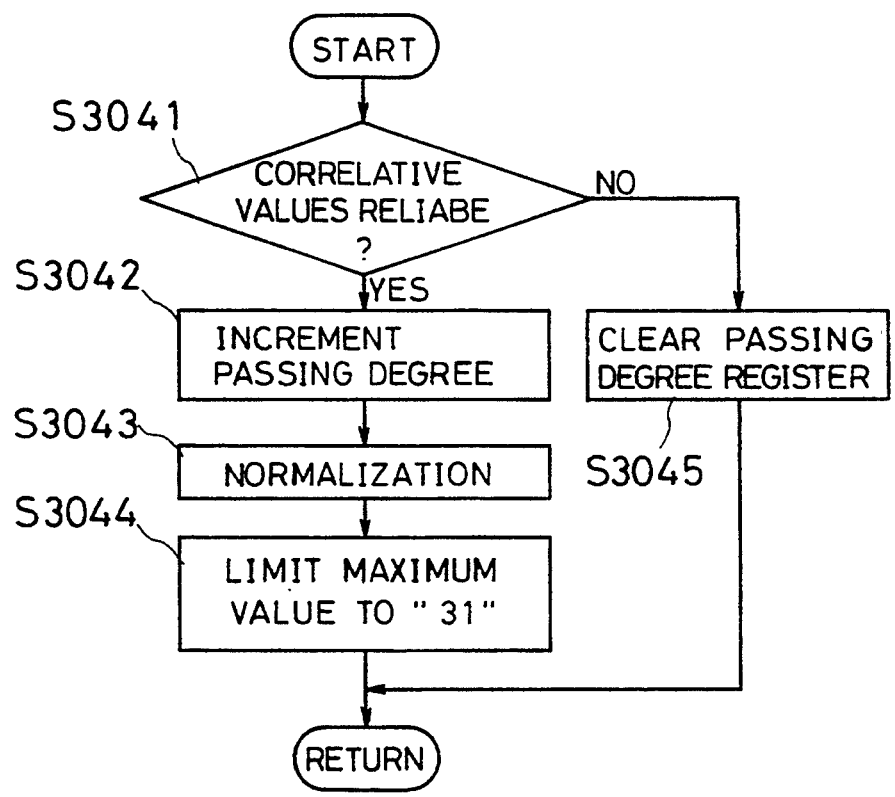
FIG. 10 is a flowchart showing a passing degree calculating routine shown in FIG. 7.

A next step S304 is shown in FIG. 10 in detail. In a step S3041 shown in FIG. 10, the microcomputer 26 first determines whether or not the correlative values previously inputted are reliable. If each correlative value is smaller than a predetermined value, since the correlative value is reliable, in a next step S3042, the microcomputer 26 increments the passing degree register (not shown) by "+1". In a next step S3043, the microcomputer 26 performs a normalization of the passing degree by multiplying the value of the passing degree register by a predetermined coefficient.

Data of the correlative value is inputted at every 1/60 seconds, and the passing degree register is constructed as a register of 8 bits. However, 5-bit data is handled in operating membership functions described later, and therefore, in a normalization process in the step S3043, it is determined what 5 bits out of the above described 8 bits are to be utilized as the data of the passing degree.

In addition, if no passing object exists, the value of the passing degree register continuously incremented, and the value becomes large; however, a fact that the passing degree becomes large has no meanings in operating the membership functions, and therefore, in a step S3044, the passing degree is limited to a proper value ("31" in this embodiment shown).

Furthermore, when the correlative value itself is not reliable as in a case where the correlative value is drastically changed, for example, in a step S3045, the microcomputer 26 clears the passing degree register.

A fact that it is determined whether or not the correlative values for each field inputted at every 1/60 seconds are reliable by executing the above described passing degree calculating routine means that a lapse time from a timing when the correlative values becomes to be reliable is calculated. Therefore, it is possible to surely determine whether or not a passing object enters in the block on the basis of the lapse time. Therefore, by removing the block to which a passing object enters from a picture stabilization or an unintentional movement correction, it is possible to eliminate an unnaturalness of an image.

Figure 11:
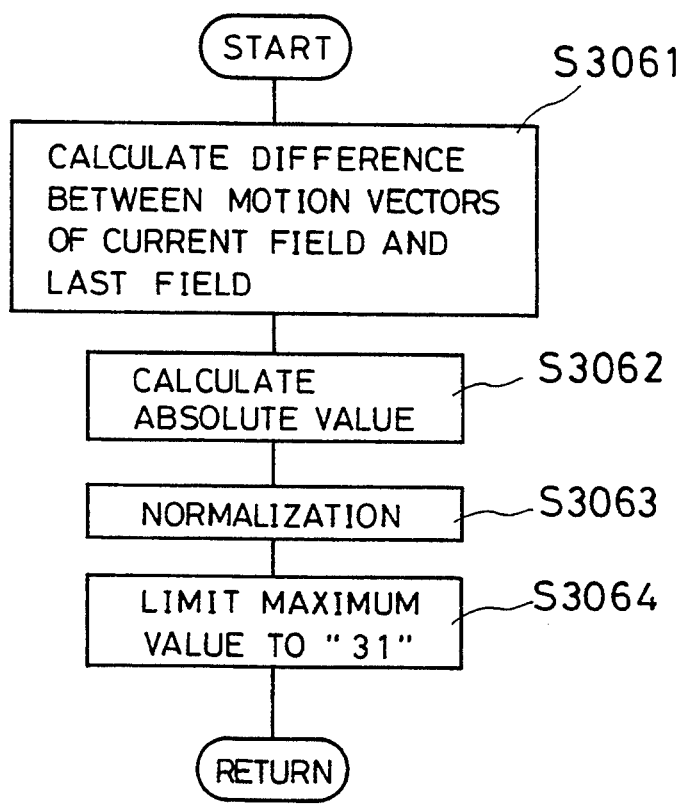
FIG. 11 is a flowchart showing a variation calculating routine shown in FIG. 7.

Furthermore, in this embodiment shown, in order to secure more accuracy in the steps S305 and S306, a variation is calculated. This "variation" is an absolute value of a difference between a motion vector of the current field and a motion vector of the last field, and specifically, the variation can be obtained by executing a routine shown in FIG. 11. More specifically, in a first step S3061 shown in FIG. 11, the microcomputer 26 calculates a difference between the motion vector of the current field and the motion vector of the last field, and in a next step S3062, an absolute value of the difference is evaluated. In a next step S3063, the absolute value thus evaluated is multiplied by a predetermined coefficient such that the variation is normalized, and the variation is set into a variation register (not shown). In addition, as to the variation, a maximum value is also limited to "31" (step S3064) as similar to the above described passing degree. Then, the variation does not become so large in a state where a normal unintentional movement occurs. That is, a fact that a large variation exists means that a passing object enters in any block, and therefore, in such a case, the block is removed from a picture stabilization or an unintentional movement correction.

In a succeeding step S307 (FIG. 7), the microcomputer 26 calculates membership functions utilizing "increase", "passing degree" and "variation" which are calculated in the above described manner as parameters according to a next table I.

TABLE I

| rule number | variation | increase | passing degree | reliability |
|---|---|---|---|---|
| 1 | small 1 | small 1 | small 2 | 7 |
| 2 | small 1 | small 1 | z small 2 | 10 |
| 3 | small 1 | big 1 | z big 2 | 3 |
| 4 | small 1 | big 1 | big 2 | 8 |
| 5 | big 1 | small 1 | z big 2 | 2 |
| 6 | big 1 | small 1 | big 2 | 6 |
| 7 | big 1 | big 1 | z big 2 | 0 |
| 8 | big 1 | big 1 | big 2 | 5 |

Respective rules indicated in the table I are determined in accordance with the following conditions.

[Rule 1] When the variation is small and the increase is also small, the data of the block is reliable well enough even if the passing degree is very small.

[Rule 2] The data of the block is very reliable when the variation is small, the increase is small and the passing degree is not so small.

[Rule 3] When the increase is large and the passing degree is not so large, the data of the block is not very reliable even if the variation is small.

[Rule 4] When variation is small and the passing degree is very large, the data of the block is reliable well enough even if the increase is large.

[Rule 5] When the variation is large and the passing degree is not so large, the data of the block is not very reliable even if the increase is small.

[Rule 6] When the increase is small and the passing degree is very large, the data of the block is reliable at some extent even if the variation is large.

[Rule 7] When the variation is large, the increase is large and the passing degree is not so large, the data of the block is not reliable.

[Rule 8] When the passing degree is very large, the data of the block is reliable at some extent even if the variation is large and the increase is large.

According to such rules, it is possible to prevent that no passing object exists in the block from being erroneously determined by referring to the increase when the passing degree becomes slightly large after a passing object enters in the block at a timing shown by the reference numeral 54 in FIG. 9.

Figure 12A:
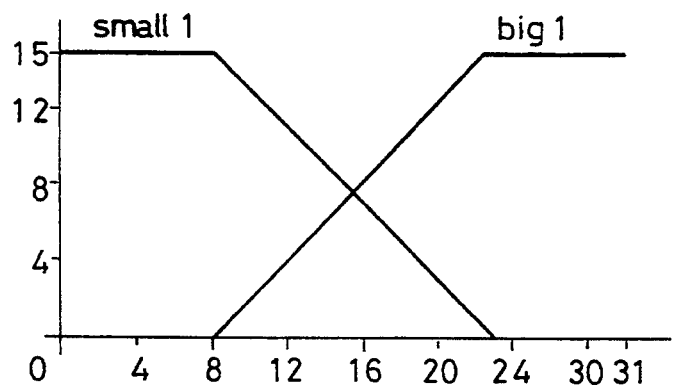
FIGS. 12A, 12B and 12C are graphs showing relationships between membership functions and parameters.
Figure 12B:
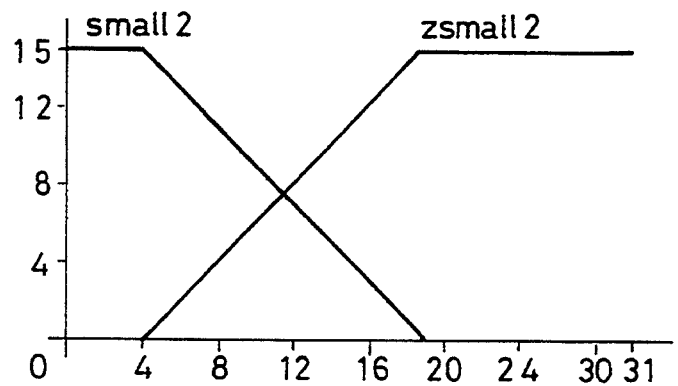
Figure 12C:
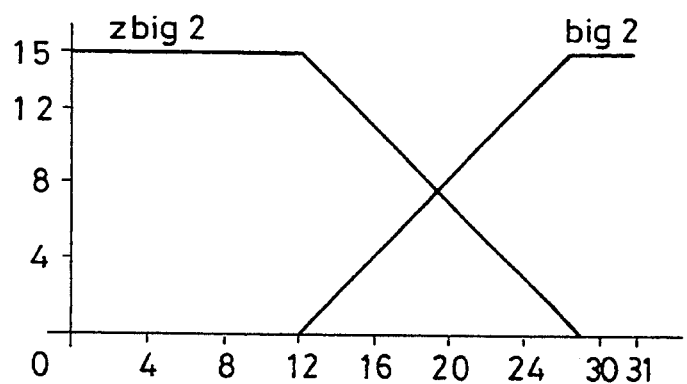

In a step S307, values of the increase, passing degree and variation are converted into membership values according to the membership functions shown in FIGS. 12A, 12B and 12C. In a succeeding step S308, the membership values are applied to the fuzzy rules indicated in the table I, a maximum value of the membership value becomes a representative membership value of the rule. A simple sum (Z) of the representative membership values of all the rules, and an integrated sum (W) of values obtained by multiplying the representative membership values by reliability (table I) of all the rules are calculated. Then, in a next step S309, the microcomputer 26 determines "Z<TW". In addition, T=Z/W, and a threshold value of T is set as "0.8", for example. At this time, according to a principle that the smaller the value of T, the more reliable the motion vector of the block, the date of the motion vector of the block having T more than the threshold value (=0.8) is made invalid in a step S310. Therefore, the block is removed from a picture stabilization or a correction of an unintentional movement.

Then, after the step S310, or when "YES" is determined in the step S309, in a step S311, the microcomputer 26 determines whether or not examinations from the step S301 to the step S310 are completed for all the blocks. If not completed, the microcomputer 26 increments a block counter formed in a suitable region of the RAM (not shown), and the process returns again to the step S301. Then, the examinations for all the blocks are completed, the process returns from the routine shown in FIG. 7 to the main routine shown in FIG. 6.

In addition, in the above described embodiment, an invalid block is determined according to the fuzzy inference by utilizing all the parameters of the increase, passing degree and variation. However, as described in the following, it is possible to determine an invalid block by utilizing only one of the parameters.

A flowchart showing an operation for determining an invalid block by utilizing the increase only is shown in FIG. 13A and 13B. An operation from a step S3021 to a step S3033 shown in FIG. 13 are similar to respective steps shown in FIG. 8 being corresponding thereto, and therefore, a duplicate description will be omitted here.

Then, in a step S3034 shown in FIG. 13B, the microcomputer 26 determines whether or not the increase that as been calculated any one of the steps S3022, S3026, S3028, S3030, S3031 and S3033 shown in FIG. 13 is more than a predetermined threshold value ("15" in this embodiment shown). If the increases larger than "15", since the motion vector of the block is not reliable, in a step S3035, the data of the motion vector of the block is made invalid such that the data is not utilized for performing a picture stabilization. Until it is detected that all the blocks are completed in a step S3036, the process from the step S3021 to the step S3035 are repeatedly executed through a step S3037. If it is detected that all the blocks are completed in the step S3036, the process returns to the main routine shown in FIG. 6.

Figure 14:
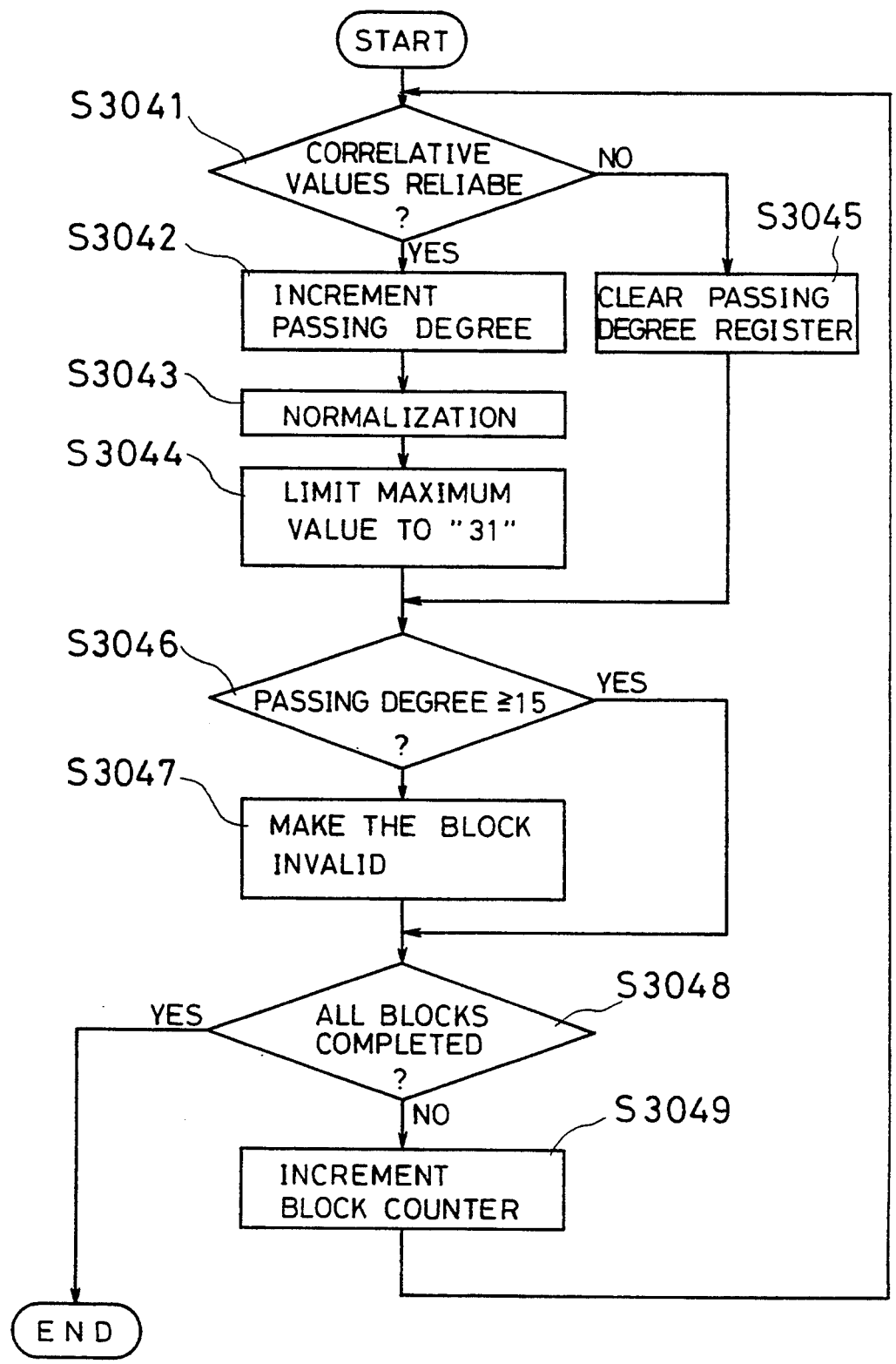
FIG. 14 is a flowchart showing determination of an invalid block utilizing only a passing degree.

A flowchart showing an operation for determining an invalid block by utilizing the passing degree only is shown in FIG. 14. An operation from a step S3041 to a step S3045 shown in FIG. 14 are similar to respective steps shown in FIG. 10 being corresponding thereto, and therefore, a duplicate description will be omitted here.

Then, in a step S3046 shown in FIG. 14, the microcomputer 26 determines whether or not the passing degree that as been calculated any one of the steps S3044 and S3045 shown in FIG. 14 is more than a predetermined threshold value ("15" in this embodiment shown). If the passing degree is smaller than "15", since the motion vector of the block is not reliable, in a step S3047, the data of the motion vector of the block is made invalid such that the data is not utilized for performing a picture stabilization. Until it is detected that all the blocks are completed in a step S3048, the process from the step S3041 to the step S3047 are repeatedly executed through a step S3049. If it is detected that all the blocks are completed in the step S3048, the process returns to the main routine shown in FIG. 6.

Figure 15:
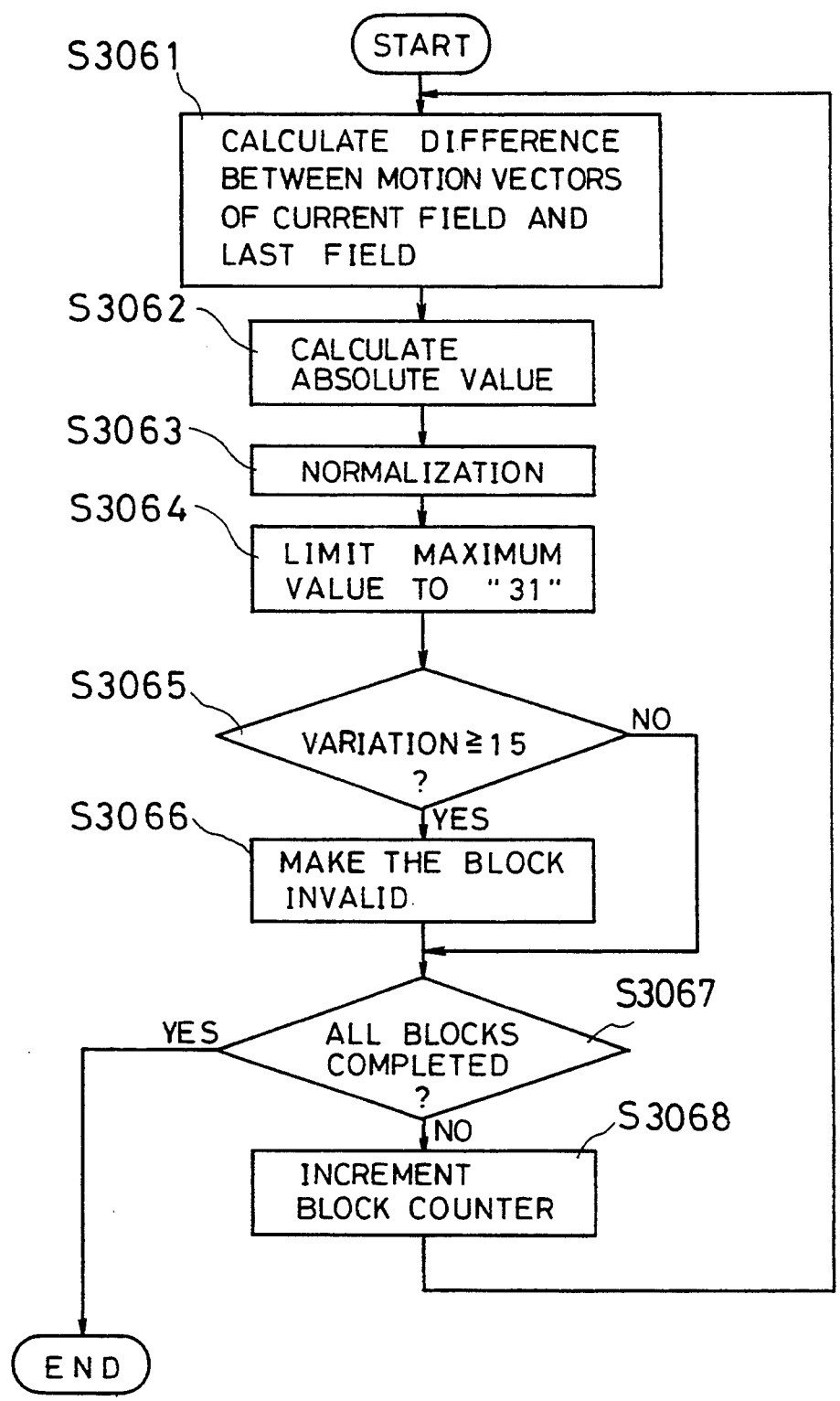
FIG. 15 is a flowchart showing determination of an invalid block utilizing only a variations.

A flowchart showing an operation for determining an invalid block by utilizing the variation only is shown in FIG. 15. An operation from a step S3061 to a step S3064 shown in FIG. 15 are similar to respective steps shown in FIG. 11 being corresponding thereto, and therefore, a duplicate description will be omitted here.

Then, in a step S3065 shown in FIG. 15, the microcomputer 26 determines whether or not the variation that has been calculated any one of the step S3064 in FIG. 15 is more than a predetermined threshold value ("15" in this embodiment shown). If the variation larger than "15", since the motion vector of the block is not reliable, in a step S3066, the data of the motion vector of the block is made invalid such that the data is not utilized for performing a picture stabilization. Until it is detected that all the blocks are completed in a step S3067, the process from the step S3061 to the step S3066 are repeatedly executed through a step S3067. If it is detected that all the blocks are completed in the step S3066, the process returns to the main routine shown in FIG. 6.

In the above described embodiments, the increase and the passing degree are calculated by incrementing from the minimum value "0". However, these may be calculated by decrementing from a maximum value "31", for example.

Figure 16:
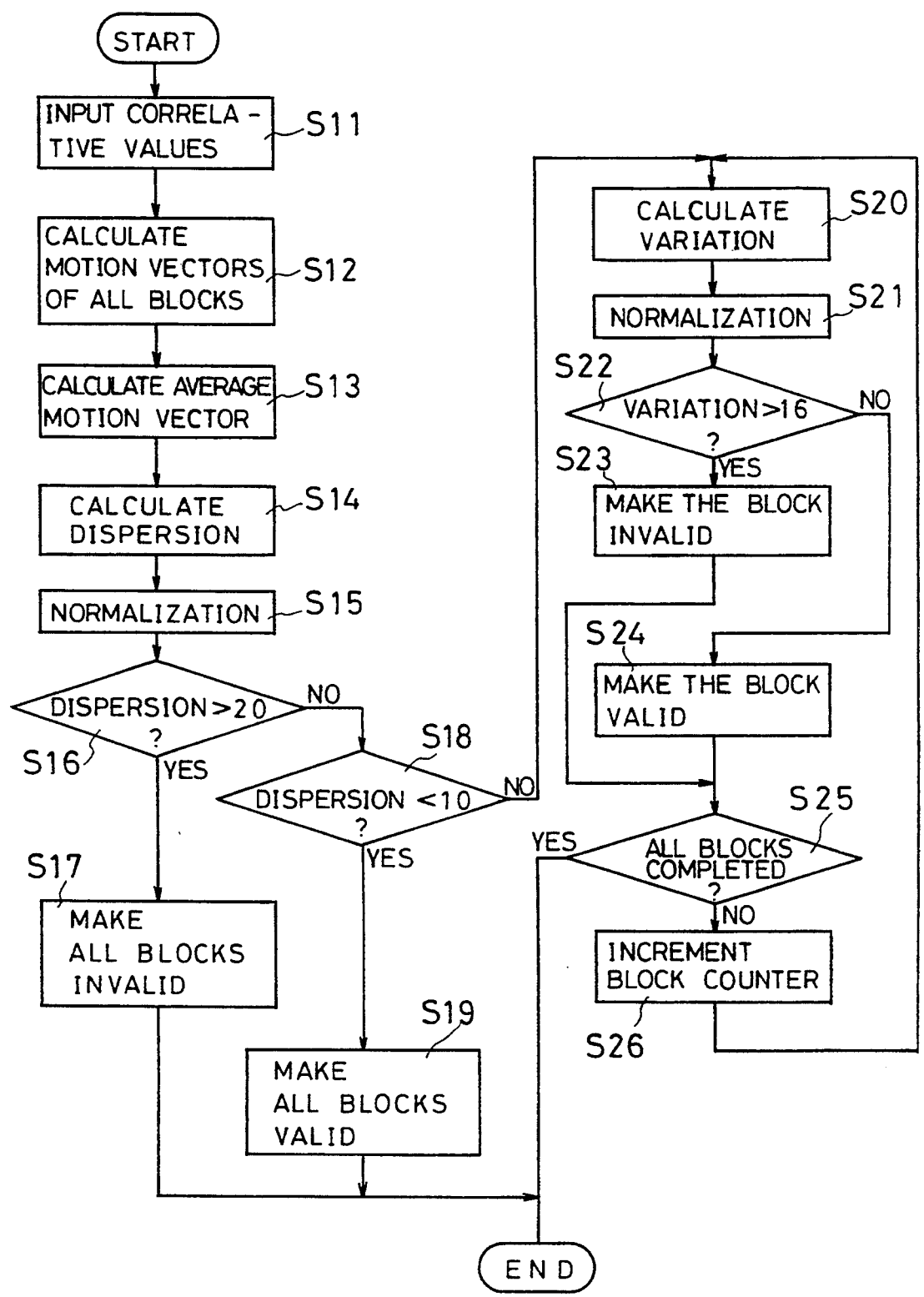
FIG. 16 is a flowchart showing determination of an invalid block utilizing a dispersion and the variation.

Furthermore, as shown in FIG. 16, an invalid block that is removed from a picture stabilization may be determined by using the dispersion and the variation. More specifically, in a first step S11 shown in FIG. 16, the microcomputer 26 receives the correlative values data from the motion detecting circuit 20. Motion vectors of the respective blocks are calculated in a succeeding steps S12, and an average motion vector is calculated in a step S13. Then, in a step S14, the microcomputer 26 calculates the dispersion according to the aforementioned equation. The dispersion is normalized such that a maximum value thereof becomes "31" in a next step S15. The dispersion is stored in a dispersion register (not shown).

First, on the basis of the dispersion thus evaluated, an invalid block is determined by executing the process from a step S16 to a step S19. More specifically, in the step S16, the microcomputer 26 determines whether or not the dispersion is larger than "20" with referring to the dispersion register. Then, if the dispersion is larger than "20", it is determined that there is no reliability in data of the correlative values and the motion vectors of the current field, and therefore, in a step S17, the data of all the blocks are made invalid so that all the blocks are removed from a picture stabilization. If the dispersion is smaller than "20", in a step S18, microcomputer 26 further determines whether or not the dispersion is smaller than "10" by referring to the dispersion register. If the dispersion is smaller than "10", the data of all the blocks of the current field are handled as valid data (step S19).

Then, if the dispersion exists in a range between "10" and "20", that is, if 10≦dispersion≦20, in a succeeding step S20, the microcomputer 26 calculates the variation of the block. In addition, the variation is an absolute value of a difference between the motion vector of the last field and the motion vector of the current field as similar to that of the previous embodiments.

In a step S21, the microcomputer 26 makes a normalization of the variation such that a maximum value thereof becomes "31" by multiplying the absolute value as calculated by a proper coefficient. Then, in a step S22, the microcomputer 26 determines whether or not the variation is larger than "16" with referring to the variation register. If the variation is larger than "16", in a step S24, the block is made invalid. If the variation is smaller than "16", the data of the block is handled as valid data (step S23).

Thereafter, in a step S25, the microcomputer 26 determines, with referring to the block counter, whether or not the examinations of the variations for all the blocks are completed If "NO" the process returns again to the step S20 through a step S26. Then, when the examinations of the all the blocks are completed, the process jumps to the fuzzy routine of the previous step S3. However, in a case where all the blocks are made invalid in the previous step S17, or in a case where all the blocks is made valid in the step S19, the fuzzy routine is executed after one of these steps.

Figure 17:
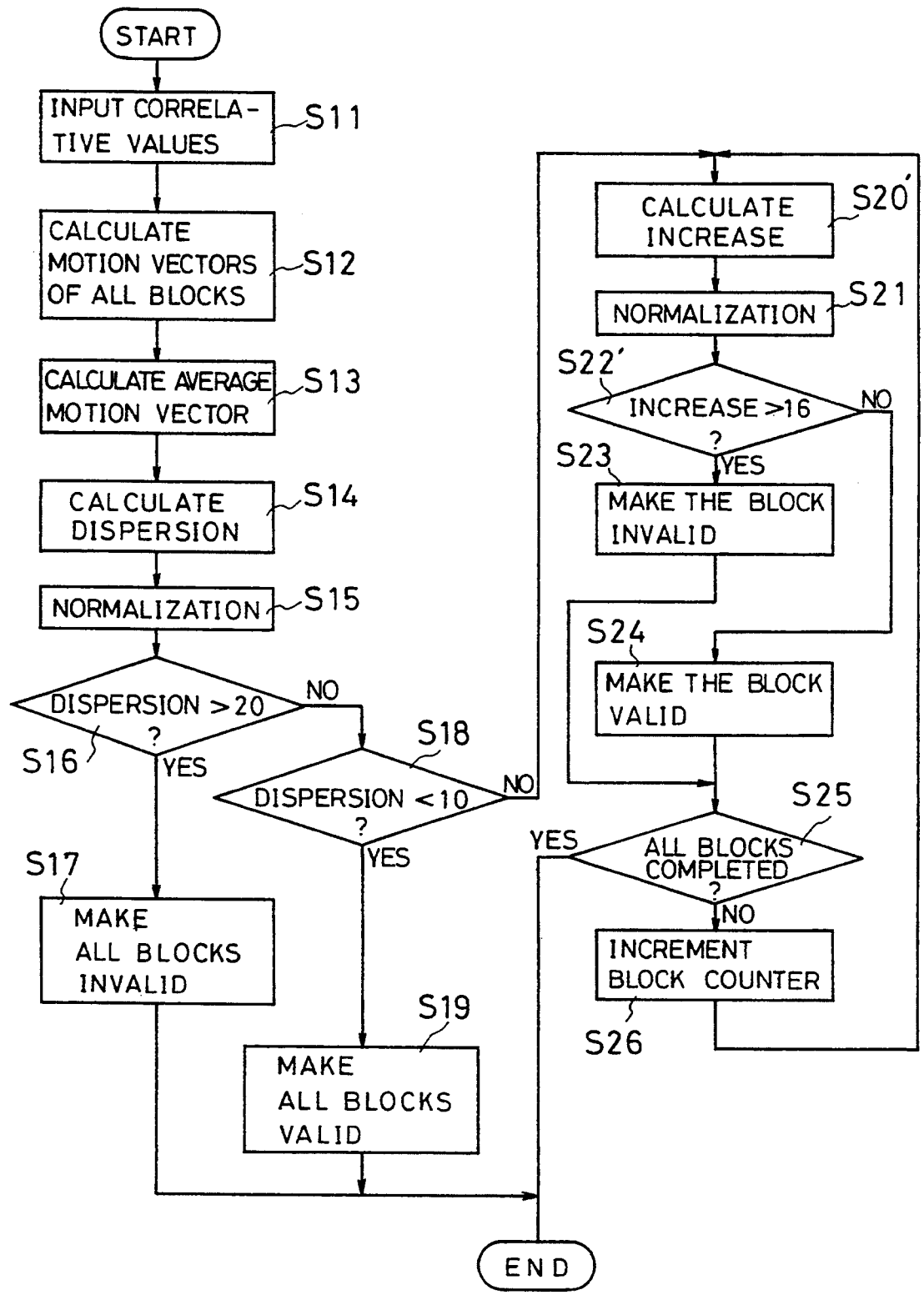
FIG. 17 is a flowchart showing determination of an invalid block utilizing the dispersion and the increase.

Furthermore, as shown in FIG. 17, an invalid block that is removed from a picture stabilization may be determined by using the dispersion and the increase. In addition, FIG. 17 embodiment is similar to FIG. 16 embodiment except that the steps S20 and S22 of FIG. 16 embodiment are changed to steps S20' and S22' and therefore, a duplicate description will be omitted here.

In FIG. 17 embodiment, if the dispersion exists in a range between "10" and "20" that is, if 10≦dispersions≦20, in a succeeding step S20', the microcomputer 26 calculates the increase of the block. In addition, the increase is a parameter representative of a time period during when motion vectors having the same direction are succeedingly obtained as similar to that of the previous embodiments.

In a step S21, the microcomputer 26 makes a normalization of the increase such that a maximum value thereof becomes "31" by multiplying the absolute value as calculated by a proper coefficient. Then, in a step S22', the microcomputer 26 determines whether or not the increase is larger than "16" with referring to the variation register. If the increase is larger than "16", in a step S23, the block is made invalid. If the increase is smaller than "16", the data of the block is handled as valid data (step S23).

Furthermore, in another embodiment according to the present invention, an invalid block is determined by using "isolation" that is different from the above described increase, passing degree, variation and dispersion as a parameter.

The isolation is calculated by the microcomputer 26 for each block on the basis of the motion vectors of the blocks and the average motion vector. That is, the isolation can be calculated by dividing an absolute value of a difference between the motion vector of each block and the average motion vector with an absolute value of a mean value of an X direction component and a Y direction component of the average motion vector. Therefore, it will be easily understood this "isolation" is a parameter representing how a demeanor of the block is different from demeanors of other blocks.

Figure 18:
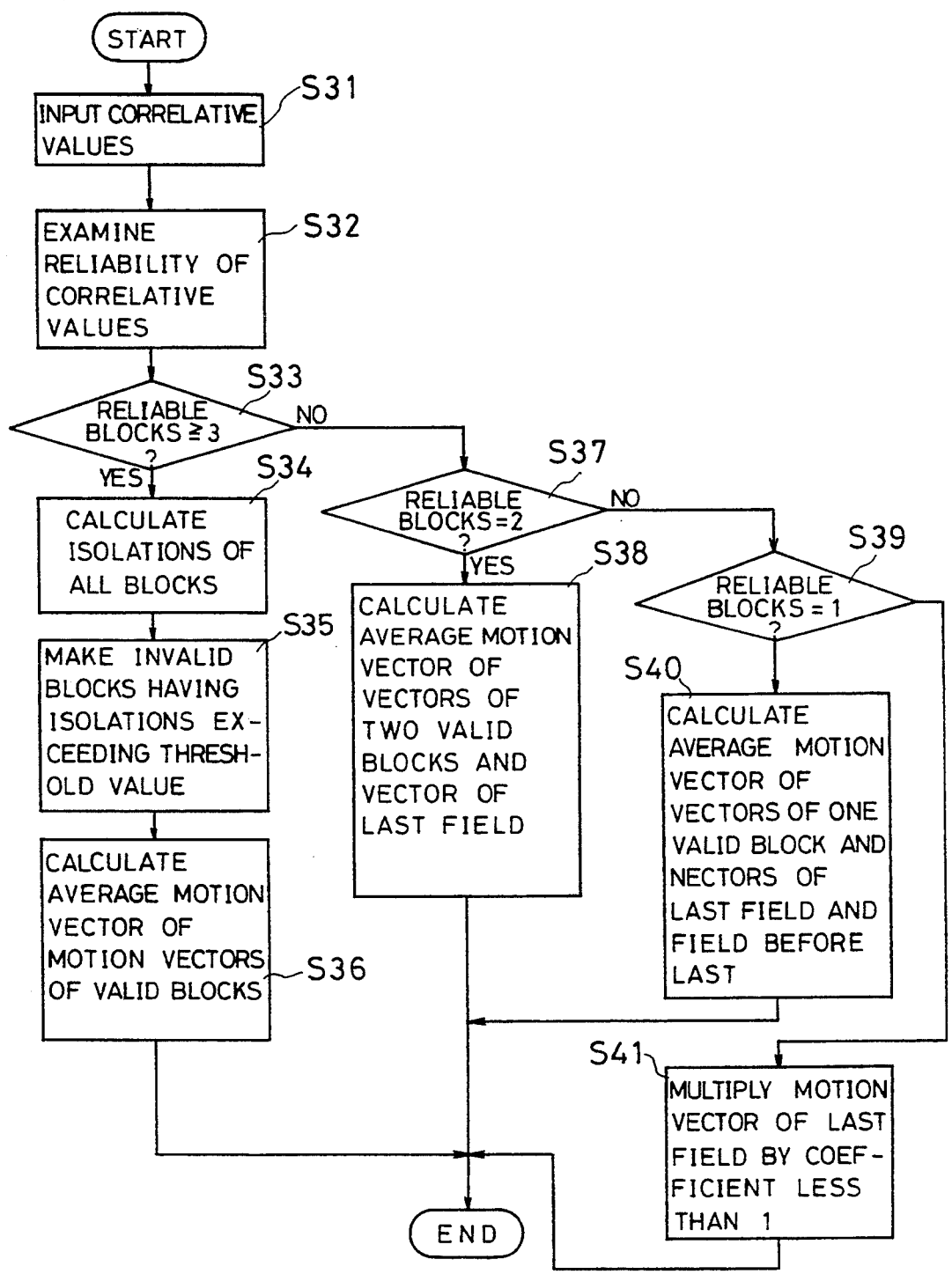
FIG. 18 is a flowchart showing another embodiment according to the present invention, in which an isolation is utilized.

In a first step S31 shown in FIG. 18, the microcomputer 26 receives correlative values data from the motion detecting circuit 20 shown in FIG. 1. Then, in a step S32, the microcomputer 26 determined whether or not the correlative values data are reliable. More specifically, data of a block in which a minimum correlative value is smaller than a predetermined threshold value or data of a block in which a minimum value/a mean value is smaller than a predetermined threshold level is considered not reliable.

Then, in a step S33, it is determined whether or not the number of blocks having reliable correlative values data are more than "3". If "YES" is determined in the step S33, in a next step S34, the microcomputer 26 calculates the isolations of the respective blocks.

On the assumption that X direction components of the motion vectors of the blocks are $X_A$, $X_B$, $X_C$ and $X_D$, Y direction components of the motion vectors of the blocks are $Y_A$, $Y_B$, $Y_C$ and $Y_D$, a mean value of the X direction components is $X_M$ and a mean value of the Y direction components is YM, the isolations $I_A$, $I_B$, $I_C$ and $I_D$ of the blocks A, B, C and D are given by following equations. In addition, the isolation calculated for the blocks are stored in an isolation register.

$$I_A = \frac{|X_A - X_M| + |Y_A - Y_M|}{|X_M| + |Y_M|}$$

$$I_B = \frac{|X_B - X_M| + |Y_B - Y_M|}{|X_M| + |Y_M|}$$

$$I_C = \frac{|X_C - X_M| + |Y_C - Y_M|}{|X_M| + |Y_M|}$$

$$I_D = \frac{|X_D - X_M| + |Y_D - Y_M|}{|X_M| + |Y_M|}$$

The isolations of the respective blocks thus evaluated may be utilized as parameters for a fuzzy operation as similar to the previous embodiment.

However, in this embodiment shown, in a next step S35, the microcomputer 26 determines whether or not the isolation exceeds a predetermined threshold value for each block with reference to the isolation register, and a block having an isolation exceeding the predetermined threshold value is made an invalid block. Therefore, in this case, in a next step S36, the microcomputer 26 calculates an average motion vector on the basis of the motion vectors of the blocks remained as valid blocks.

When "NO" is determined in the previous step S33, the microcomputer 26 determines whether or not the number of blocks having reliable correlative value is two (2) in a step S37. If "YES" is determined in the step S37, in a next step S38, the microcomputer 26 calculates an average motion vector on the basis of the motion vectors of three blocks by adding the motion vector of the last field. In this case, an average motion vector may be calculated on the basis of remained two valid blocks only; however, in this embodiment shown, in order to implement a picture stabilization with more accuracy, the motion vector of the last field is utilized for calculating the average motion vector.

Then, if "NO" is determined in the step S37, in a step S39, the microcomputer 26 determines whether or not there is one block having reliable correlative values. If there is one block having the reliable correlative values, in a next step S40, the microcomputer 26 calculates an average motion vector of three motion vectors by adding the motion vector of the last field and the motion vector of the field before last. However, only the motion vector of only one remaining valid block may be utilized as the average motion vector.

If the microcomputer 26 determines there is no block having reliable correlative values in the step S39, in a step S41, the microcomputer 26 utilizes the average motion vector of the present field by multiplying the average motion vector of the last field by a coefficient less than "1", for example "0.97".

In addition, in calculating the isolation, the following equation may be utilized. In the equation, a, b, c and d are motion vectors of the blocks A, B, C and D, and M is an average motion vector.

$$I_A = \frac{|a - m|}{\frac{|a - m| + |b - m| + |c - m| + |d - m|}{4}}$$

In the above description, invalidity of each of the blocks by utilizing "passing degree" "increase" "variation", or "isolation", and by using only the data (correlative values or motion vectors) of the block that is determined valid, the average motion vector is calculated. However, a weighted mean value of all the motion vectors may be calculated as an average motion vector by weighting the data of the block on the basis of at least one of these parameters.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera, comprising:
an image sensing device;
signal converting means for converting an electric signal from said image sensing device into a digital video signal;
memory means for storing said digital video signal;
correlative value calculating means for calculating correlative values for each of a plurality of blocks within an image field on the basis of said digital video signal in accordance with a representative point matching method;
first calculating means for calculating motion vectors of said plurality of blocks on the basis of said correlative values;
parameter output means for outputting a parameter representative of a status of each of said plurality of blocks on the basis of at least one of said correlative values and said motion vectors,
wherein said parameter output means includes passing degree calculating means for calculating a passing degree that is an index representative of a time period until said correlative values outputted from the said correlative value calculating means become reliable,
wherein said parameter output means includes increase calculating means for calculating an increase that is an index representative of a time period during when motion vectors having the same direction are succeedingly obtained on the basis of said motion vectors calculated by said first calculating means,
wherein said parameter output means includes variation calculating means for calculating a variation that is an index representative of a degree of a change between a current motion vector and a last motion vector on the basis of said motion vectors calculated by said first calculating means, and
wherein said parameter output means includes isolation value calculating means for calculating an isolation value which is calculated by dividing an absolute value of a difference between the motion vector of each block and the average motion vector with an absolute value of a mean value of an X-direction component and a Y-direction component of the average motion vector;
second calculating means for calculating an average motion vector on the basis of said motion vectors and said parameter, wherein said second calculating means also calculates a mean value of said motion vectors of said plurality of blocks on the basis of said parameter;
memory control means for reading said digital video signal from said memory means according to addresses determined on the basis of said average motion vector;
first determining means for determining whether or not each of said plurality of blocks is invalid on the basis of said parameter, wherein said second calculating means calculates said average motion vector on the basis of motion vectors except a motion vector of a block that is determined invalid by said first determining means;
reliability calculating means for calculating a reliability of each of said plurality of blocks on the basis of said passing degree, said increase and said variation, wherein said reliability calculating means includes fuzzy means for performing a fuzzy inference according to predetermined rules by utilizing said passing degree, said increase and said variation as parameters, wherein said second calculating means calculates said average motion vector on the basis of said reliability and said motion vectors; and
second determining means for determining whether or not a motion vector of each of said plurality of blocks is reliable, wherein said isolation index calculating means calculates said isolation index when it is determined three or more blocks are reliable by said second determining means.

2. A picture stabilizer, comprising:
an image sensing device;
signal converting means for converting an electric signal from said image sensing device into a digital video signal;
memory means for storing said digital video signal;
correlative value calculating means for calculating correlative values for each of a plurality of blocks within an image field on the basis of said digital video signal in accordance with representative points matching method;
first calculating means for calculating motion vectors of said plurality of blocks on the basis of said correlative values;
parameter output means for outputting a parameter representative of a status of each of said plurality of blocks on the basis of at least one of said correlative values and said motion vectors,
wherein said parameter output means includes degree calculating means for calculating a passing degree that is an index representative of a time period until said correlative values outputted from the said correlative value calculating means become reliable,
wherein said parameter output means includes increase calculating means for calculating an increase that is an index representative of a time period during when motion vectors having the same direction are succeedingly obtained on the basis of said motion vectors calculated by said first calculating means,
wherein said parameter output means includes variation calculating means for calculating a variation that is an index representative of a degree of a change between a current motion vector and a last motion vector on the basis of said motion vectors calculated by said first calculating means,
wherein said parameter output means includes isolation calculating means for calculating an isolation that is an index representative of a difference between an average vector and a motion vector of each block with respect to said average vector of motion vectors of said plurality of blocks;
second calculating means for calculating an average motion vector on the basis of said motion vectors and said parameter, wherein said second calculating means calculates a mean value of said motion vectors of said plurality of blocks on the basis of said parameter;
memory control means for reading said digital video signal from said memory means according to addresses determined on the basis of said average motion vector;
first determining means for determining whether or not each of said plurality of blocks is invalid on the basis of said parameter, wherein said second calculating means calculates said average motion vector on the basis of motion vectors except a motion vector of a block that is determined invalid by said first determining means;
reliability calculating means for calculating a reliability of each of said plurality of blocks on the basis of said passing degree, said increase and said variation, wherein said reliability calculating means includes fuzzy means for performing a fuzzy inference according to predetermined rules by utilizing said passing degree, said increase and said variation as parameter, and wherein said second calculating means calculates said average motion vector on the basis of said reliability and said motion vectors; and second determining means for determining whether or not a motion vector of each of said plurality of blocks is reliable, wherein said isolation calculating means calculates said isolation when it is determined three or more blocks are reliable by said second determining means.

* * * * *